United States Patent
Nemoto et al.

[11] Patent Number: 5,620,667
[45] Date of Patent: Apr. 15, 1997

[54] WET PROCESS FLUE GAS DESULFURIZATION APPARATUS

[75] Inventors: Hiroyuki Nemoto; Kiyoshi Okazoe; Kenichi Sato, all of Tokyo, Japan

[73] Assignee: Mitsubishi Jukogyo Kabushiki Kaisha, Tokyo, Japan

[21] Appl. No.: 509,864

[22] Filed: Aug. 1, 1995

[30] Foreign Application Priority Data

Sep. 12, 1994 [JP] Japan ................. 6-217002

[51] Int. Cl.⁶ .................. B01D 50/00; C01B 17/00; C01F 11/46
[52] U.S. Cl. .................. 422/171; 422/169; 422/172; 422/225; 422/231; 422/234; 423/242.1; 423/243.03; 423/555; 55/228; 210/400
[58] Field of Search ................. 422/171, 172, 422/177, 234, 190, 231, 211, 225, 262, 169; 423/235.7, 242.1, 243.03, 243.08, 555; 261/87; 210/400, 406; 55/227, 228

[56] References Cited

U.S. PATENT DOCUMENTS

| | | | |
|---|---|---|---|
| 2,198,745 | 4/1940 | Smith | 65/27 |
| 4,222,993 | 9/1980 | Holter et al. | 423/243 |
| 4,503,020 | 3/1985 | Weissert et al. | 423/242.01 |
| 4,627,970 | 12/1986 | Krüger | 423/555 |
| 4,976,936 | 12/1990 | Rathi et al. | 423/243.08 |
| 5,019,258 | 5/1991 | Pierson | 210/400 |
| 5,266,286 | 11/1993 | Ukawa et al. | 423/243.08 |
| 5,397,549 | 3/1995 | Newman | 423/235 |

FOREIGN PATENT DOCUMENTS

| | | |
|---|---|---|
| 0309848 | 4/1989 | European Pat. Off. . |
| 2372651 | 6/1978 | France . |
| 2535303 | 4/1984 | France . |

Primary Examiner—Robert J. Warden
Assistant Examiner—Hien Tran
Attorney, Agent, or Firm—Michael N. Meller

[57] ABSTRACT

The invention discloses a wet process flue gas desulfurization apparatus and method for use with a tank oxidation system. The apparatus comprises: an absorption tower having a slurry containing a calcium compound which is supplied to the bottom tank, a circulation pump for feeding the slurry in the tank into a flue gas inlet in an upper part of the absorption tank to be in contact with flue gas, and air feed means for feeding air for oxidizing into the tank, thereby absorbing and oxidizing sulfur dioxide in the flue gas by the slurry to obtain gypsum as a byproduct, wherein a vacuum type belt filter is disposed along an outer surface of a side wall of the absorption tower, and part of the slurry that is discharged from the circulation pump is led into the belt filter to be dehydrated, thereby separating and recovering gypsum.

2 Claims, 3 Drawing Sheets

5,620,667

WET PROCESS FLUE GAS DESULFURIZATION APPARATUS

FIELD OF THE INVENTION

The present invention relates to a wet process flue gas desulfurization apparatus small and simple in construction for separating and recovering by product gypsum.

DESCRIPTION OF THE RELATED ART

In conventional desulfurization process apparatus, the main stream feeds air into the tank of an absorption tower to oxidize the contents by causing the absorbent slurry (composed of a calcium compound, such as limestone) absorbing sulfur dioxide (sulfurous acid gas) to contact with air, not requiring an oxidation tower (so-called tank oxidation system). FIG. 3 is a conventional example of such a wet process lime/limestone desulfurization apparatus.

This conventional apparatus comprises an agitation bar 4 rotated horizontally by a motor (not shown) as being supported on a hollow rotary shaft 3 in a tank 2 of an absorption tower 1, an air feed pipe 5 extended from the hollow rotary shaft 3 with its opening end 5a extended to the lower side of the agitation bar 4, and a rotary joint 6 for connecting the base end side of the hollow rotary shaft 3 to the air source. By rotating the hollow rotary shaft 3 while feeding air under pressure, air C is supplied from the air feed pipe 5 into the vapor phase region produced at the back side in the rotating direction of the agitation bar 4, and multiple uniform fine bubbles are formed by causing breaking phenomenon in the terminal end of the vapor phase region by the vortex force caused by rotation of the agitation bar 4, and the absorbent slurry solution absorbing sulfur dioxide and air are mixed efficiently in the tank 2, and the whole volume of the absorbent slurry solution is oxidized, and gypsum is thus obtained.

In this apparatus, untreated flue gas A is introduced into a flue gas inlet 1a of the absorption tower 1, the absorbent slurry solution is injected from a header pipe 8 by a circulation pump 7, and the flue gas A is caused to contact therewith to absorb and remove the sulfur dioxide in the untreated flue gas A, and the treated flue gas B is discharged from a flue gas outlet 1b. The absorbent slurry solution absorbing sulfur dioxide being injected from the header pipe 8 passes through a parking 9 and flows down into the tank 2, and it is oxidized by contacting with multiple bubbles caused by breaking phenomenon as being agitated by the agitation bar 4 in the tank 2, and further neutralization reaction is induced to produce gypsum. Principal reactions taking place in this process are expressed in formulas (1) to (3).
(Absorption tower flue gas inlet)

$$SO_2 + H_2O \rightarrow H^+ + HSO_3^- \tag{1}$$

(Tank)

$$H^+HSO_3^- + 1/2O_2 \rightarrow 2H^+ + SO_4^{2-} \tag{2}$$

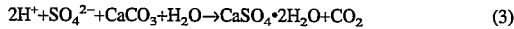
$$2H^+ + SO_4^{2-} + CaCO_3 + H_2O \rightarrow CaSO_4 \cdot 2H_2O + CO_2 \tag{3}$$

In this way, gypsum and an amount of limestone which is an adsorbent are suspended in the tank 2, and the suspension is sucked out by a slurry pump 10, and transformed into concentrate D through a thickener 11. It is then supplied into a solid-liquid separator 12 through a slurry pump 11a, and filtered, with dry gypsum E (usually having a water content of about 10%) removed. On the other hand, the supernatant F from the thickener 11 and filtrate from the solid-liquid separator 12 are sent into a filtrate tank 13, in which limestone G is added to form absorbent slurry, which is supplied again into the tank 2 from a slurry pump 14.

In this apparatus, the hollow rotary shaft 3, air feed pipe 5, and rotary joint 6 compose air feed means. During operation, in order to maintain high the desulfurization rate and gypsum purity, the concentration of sulfur dioxide in the untreated flue gas A and pH in the tank are detected by sensors, and the feed rate of limestone and feed rate of absorbent slurry are properly adjusted by a control device (not shown). The absorbent slurry is supplied from a separate limestone slurry tank (also not shown).

Thus, in this wet process flue gas desulfurization apparatus, for the solid-liquid separation process of gypsum slurry, the solid-liquid separation apparatus composed of plural complicated and large devices such as slurry pumps 10, 11a, thickener 11, and solid-liquid separator (centrifugal separator, decanter type centrifugal settling machine, etc.) was used, and in order to decrease water discharge amount by recycling the separated water, the filtrate tank 13 and slurry pump 14 were needed. Therefore, to reduce the size of the wet process flue gas desulfurization apparatus and save the space for installation, it has been long needed to downsize and simplify the constitution necessary for the solid-liquid separation process.

SUMMARY OF THE INVENTION

It is accordingly a primary object of the invention to present a wet process flue gas desulfurization apparatus capable of separating liquid and solid for recovering gypsum in a small and simple construction, and reduced in size and space for installation on the whole.

To achieve this object, the invention presents a wet process flue gas desulfurization apparatus of tank oxidation system comprising an absorption tower having a slurry containing calcium compound supplied in the bottom tank, a circulation pump for feeding the slurry in the tank into the flue gas inlet in the upper part of the absorption tank to contact with flue gas, and air feed means for feeding air for oxidizing into the tank, thereby absorbing and oxidizing sulfur dioxide in the flue gas by the slurry to obtain gypsum as a byproduct, wherein a vacuum type belt filter is disposed along the outer surface of a side wall of the absorption tower, and part of the slurry that is discharged from the circulation pump is led into the belt filter to be dehydrated, thereby separating and recovered gypsum.

In another embodiment of the wet process flue gas desulfurization apparatus of the invention, a cyclone for concentrating the gypsum content in the slurry is connected to a terminal end of the piping for leading part of the slurry into the belt filter, and the concentrated slurry that is discharged from the lower end of the cyclone flows down into the slurry inlet of the belt filter.

In a different embodiment of the wet process flue gas desulfurization apparatus of the invention, an evacuating pump for the belt filter functions as an air source of the air feed means.

According to the invention, the vacuum type belt filter is disposed along the outer surface of the side wall of the absorption tower, and part of the slurry that is discharged from the circulation pump is led into the belt filter to be dehydrated to separate and recover gypsum, and hence the circulation pump also functions as the pump for sucking out the slurry for separating and recovering gypsum, so that the number of parts is curtailed, and moreover the piping and other construction for separating and recovering gypsum are notably reduced in size, so as to make the space around the absorption tower very compact.

Besides, the cyclone for concentrating the gypsum portion in the slurry is connected to the terminal end of the piping for leading the slurry into the belt filter, and the concentrated slurry is discharged from the lower end of the cyclone flows down into the slurry inlet of the belt filter, and in this case, there are two stages of dehydration by the cyclone and belt filter, and the unreacted calcium compound is removed by this cyclone, and hence the solid matter of gypsum is high in purity is finally obtained, if the water content in the tank of the absorption tower or the content of unreacted calcium compound is high. In this case, where gypsum slurry is supplied into the cyclone from the circulation pump with the concentrated slurry flowing out of the cyclone directly led into the belt filter, an additional slurry pump is not needed, so that the cyclone is compactly installed around the absorption tower.

Moreover, when the evacuating pump for the belt filter functions as the air source of the air feed means, the number of parts is further curtailed.

DESCRIPTION OF THE PREFERRED EMBODIMENTS

Figure 1:
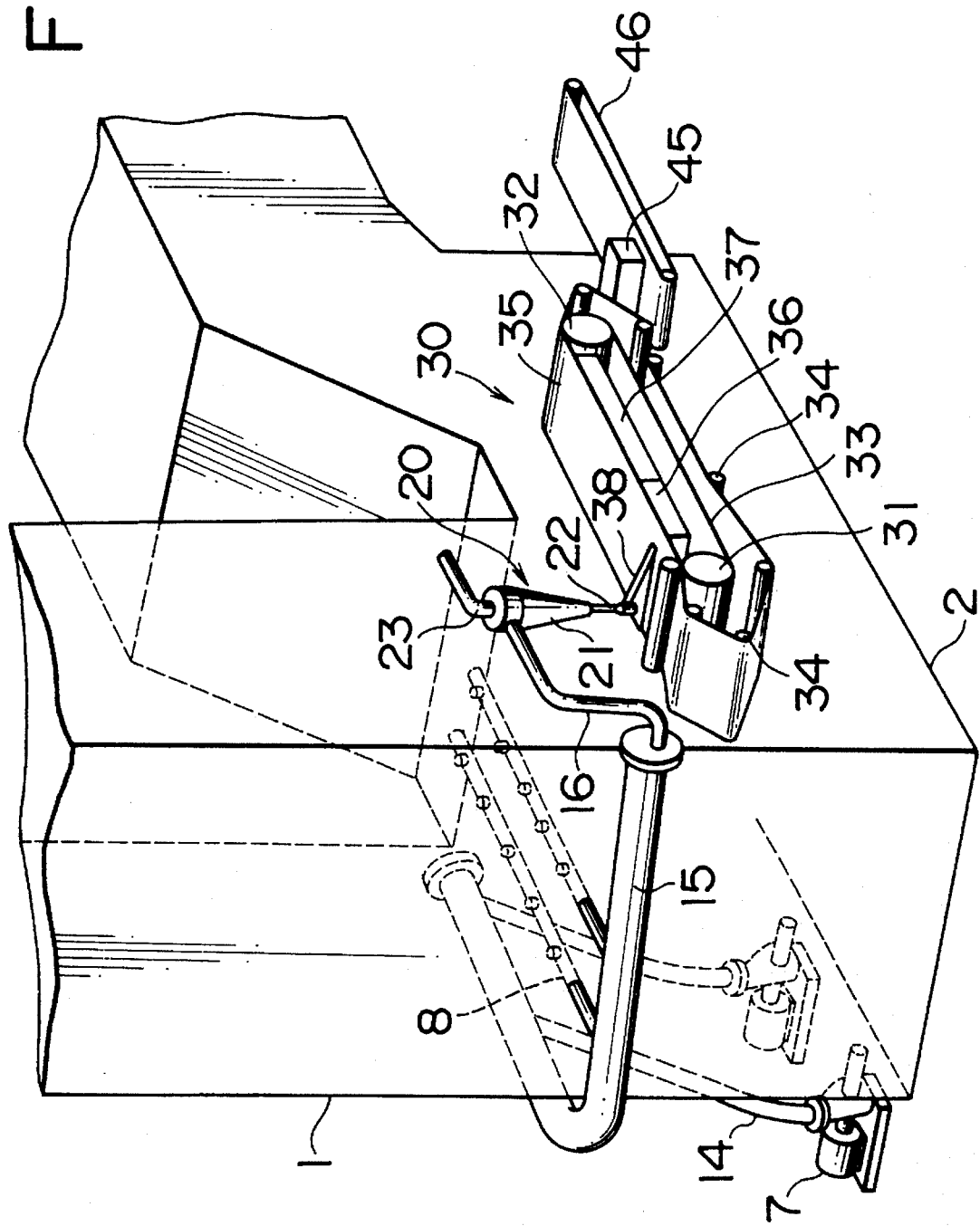
FIG. 1 is a perspective view showing configuration of principal components of wet process flue gas desulfurization apparatus in an embodiment of the invention.

An embodiment of the invention is described below while referring to FIG. 1 and FIG. 2. The same elements as in the wet process flue gas desulfurization apparatus shown in FIG. 3 are identified by the same reference numerals, with duplicated descriptions omitted.

In the wet process flue gas desulfurization apparatus of the embodiment, as shown in FIG. 1, by making use of part of the structure of an absorption tower 1, a cyclone 20 and a belt filter 30 are disposed and supported along one side of the absorption tower 1. The discharge side of a circulation pump 7 is connected to a header pipe 8 through piping 14, 15, and a piping 16 extended from the pipe end of the piping 15 is connected to the cyclone 20, and part of the slurry discharged from the circulation pump 7 is led into the cyclone 20 and belt filter 30 to concentrate, thereby separating and recovering gypsum.

The cyclone 20 operates in the same principle as a general cyclone which separates solid and liquid or coarse particles by utilizing the centrifugal settling of solid particles (coarse particles), and possesses a body 21 in a cylindrical form in the upper part and in an inverted conical form in the lower part, and a discharge pipe 22 of concentrate (coarse particles) is connected to the lower end opening of the body 21, while a riser pipe 23 having the lower end extending into the body 21 is provided on the axial line of the upper end. On the outer circumference of the upper end of the body 21, there is an inlet port (not shown) connected to the piping 16 for guiding the slurry supplied from the piping 16 in the tangential direction in the body 21.

The separation performance of the cyclone 20, like general wet process cyclones, varies with the setting of shape and dimensions of the body 21 and riser pipe 23 depending on the flow rate and properties of the supplied slurry. In this embodiment, in order that the water and unreacted limestone ($CaCO_3$) in the slurry supplied from the piping 16 may flow out massively from the riser pipe 23, the shape and dimensions of the parts are set so as to flow out from the discharge 22 by heightening the concentration of the gypsum solid matter ($CaSO_4$ $2H_2O$ to the maximum limit. Meanwhile, the water and unreacted limestone flowing out from the riser pipe 23 can be directly returned, for example, into the tank 2 to be recycled, or by connecting a vacuum tank 41 mentioned later to the riser pipe 23, they can be returned to the tank 2 through a slurry pump 43 so as to be circulated and recycled.

The belt filter 30 is a vacuum filtering machine of horizontal belt type. It comprises two drums 31, 32 rotatably supported as being disposed in a direction orthogonal to one side of the absorption tower 1, a perforated belt 33 wound on the drums 31, 32 to turn horizontally, a plurality of guide rollers 34 disposed around the perforated belt 33 being disposed in the same direction as the drums 31, 32, a filter cloth 35 of endless belt form wound on these guide rollers 34 turning in the state with the back side held tightly on the perforated belt 33 at the upper side, a slurry feed pan 36 and a vacuum pan 37 disposed so that the upper openings may be opposite to the back side of the upper side of the perforated belt 33, and a feeder 38 for leading the slurry flowing down from the discharge pipe 22 of the cyclone 20 onto the filter cloth 35 in the upstream end position (slurry inlet) of the perforated belt 33.

Herein, the slurry feed pan 36 is disposed in a specific range of the upstream side of the perforated belt 33 (the filtering range), is designed to receive the filtrate of the slurry led onto the filter cloth 33 in order to lead the slurry in this filtering range and filter the gypsum solid matter only by gravity by the filter cloth 35, and the filtrate is discharged as required.

Figure 2:
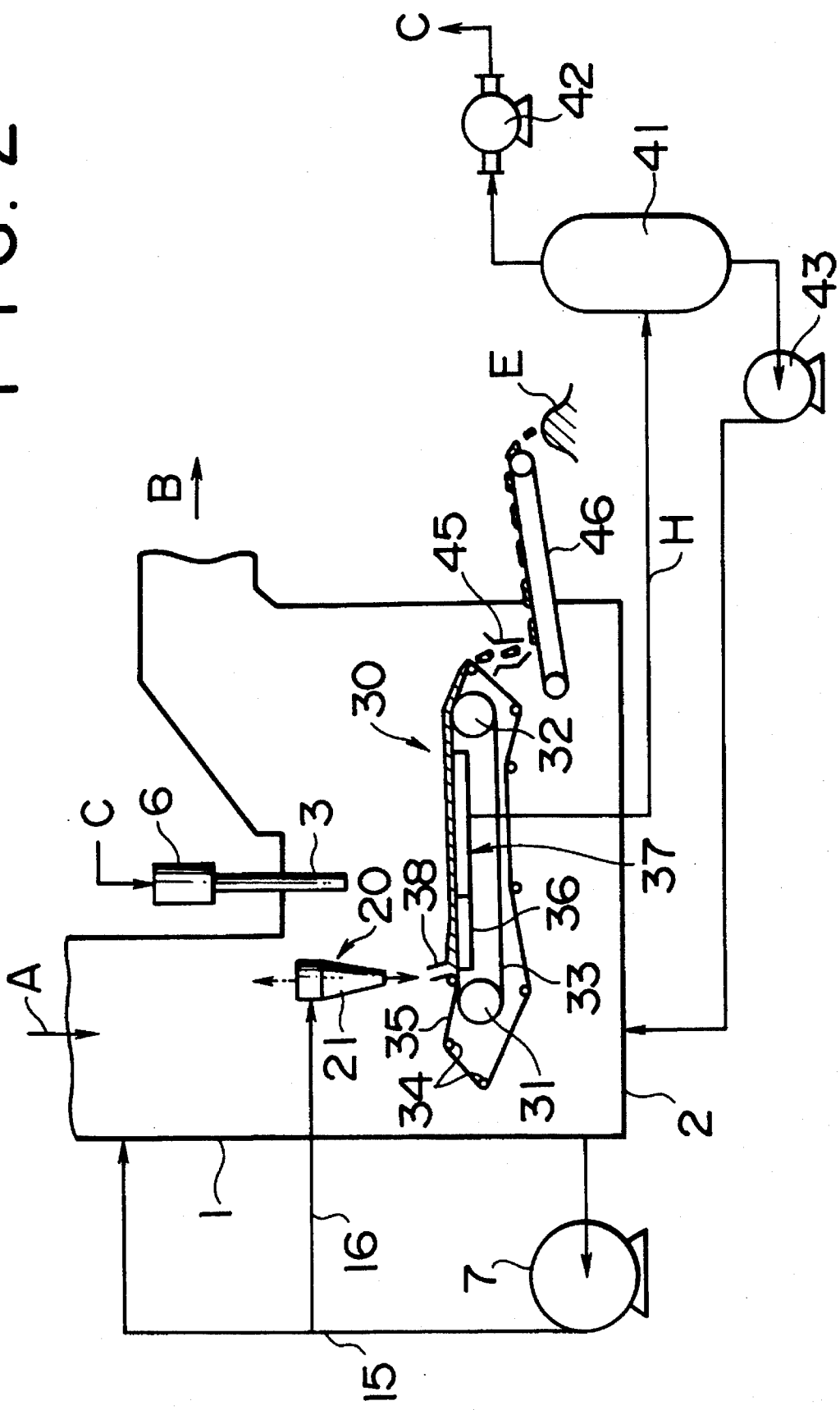
FIG. 2 is a general structural drawing of wet process flue gas desulfurization apparatus in the embodiment of the apparatus.
Figure 3:
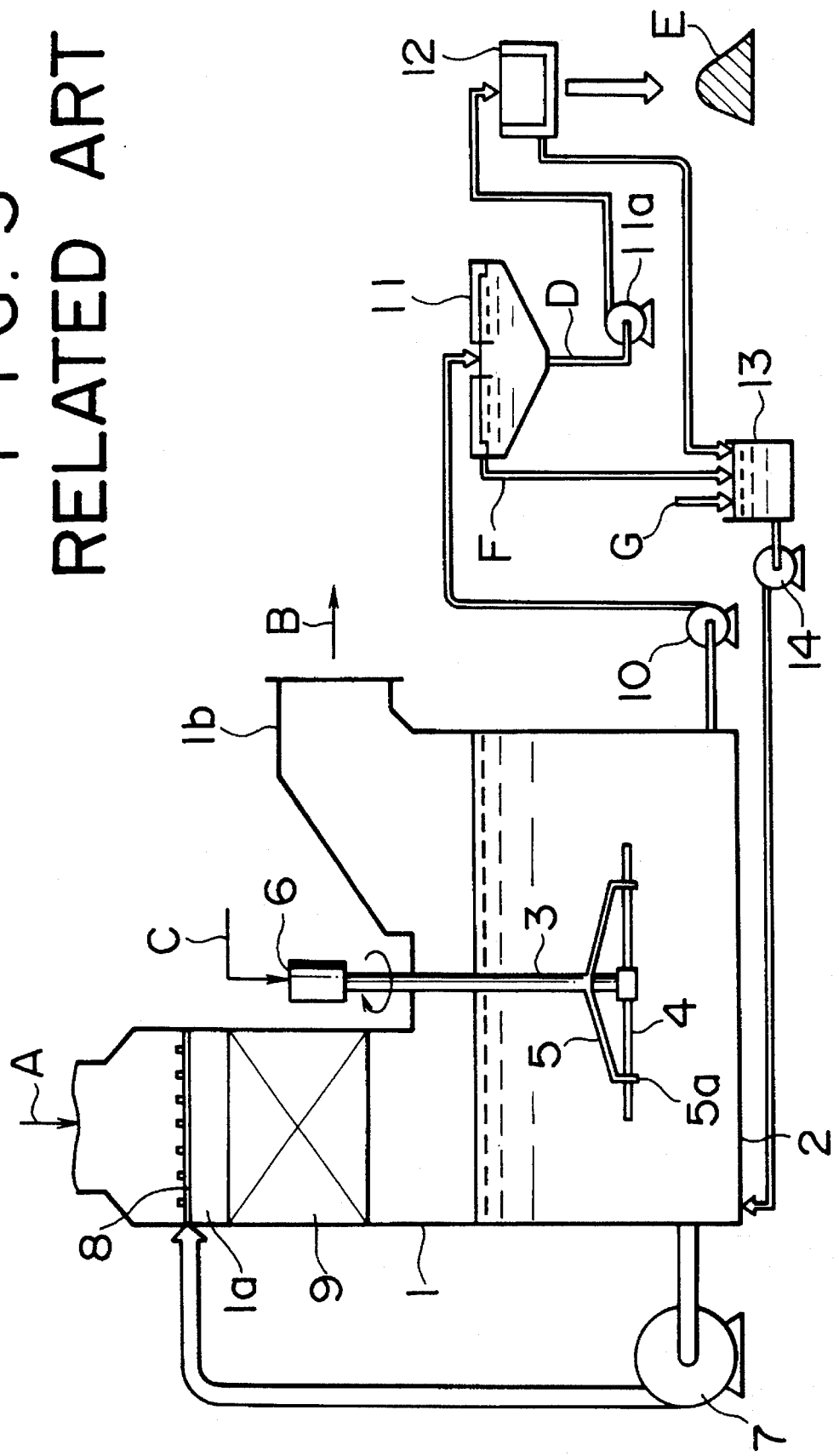
FIG. 3 is a general structural drawing showing an example of the conventional wet process flue gas desulfurization apparatus.

The vacuum pan 37 is disposed in a specific range of the back stream side of the perforated belt 33 (the dehydrating range), and is designed to slide on the back side of the perforated belt 33 while maintaining the sealing performance at the upper opening side so as to filter in vacuum the slurry in this dehydrating range, and it is connected to the evacuating pump 42 through the vacuum tank 41 as shown in FIG. 2.

The feeder 38 is tapered with the upper end connected to the discharge pipe 22 and the lower end opened, and allows the slurry to flow down uniformly in the width direction on the filter cloth 35.

In this case, the evacuating pump 42 is capable of exhibiting a discharge pressure enough to supply air necessary for oxidation reaction in the absorption tower, and the exhaust side is, as required, connected to air feed means (rotary joint 6) of the absorption tower 1 through a buffer tank or the like not shown.

The filtrate collected in the bottom of the vacuum tank 41 is directly returned, for example, to the tank 2 of the absorption tower 1 to be recycled by the slurry pump 43 having the suction side connected to the bottom of the vacuum tank 41.

The gypsum solid matter E falling into the back stream side folding position of the filter cloth 35 after vacuum filtering is received on the belt conveyor 46 through the feeder 45, and is sent out into the vicinity of the absorption tower 1.

The belt filter 30 also has a nozzle (not shown)) for injecting water into the position near the lower side of the back stream side folding position of the filter cloth 35, and the filter cloth 35 is cleaned before getting into the filtering range by the water injected from the nozzle.

In the thus constituted wet process flue gas desulfurization apparatus, the operation is described below.

From the limestone slurry tank (not shown), the absorbent slurry composed of limestone is supplied into the tank 2. In succession, by the functions of the circulation pump 7 and agitation bar 4, the flue gas is desulfurized and gypsum is produced by the same operation as in the related art, and in the stationary state, the inside of the tank 2 is a suspended state of gypsum and a slight amount of limestone as absorbent (solid matter concentration about 30 wt. % or less). Part of the slurry in the tank 2 is led out through the piping 14, 15 connected to the discharge side of the circulation pump 7, and further a certain portion thereof is led into the cyclone 20 through the piping 16. In the cyclone 20, water and unreacted limestone are separated, and discharged from the riser pipe 23, and the slurry concentrated in the gypsum solid matter flows down from the discharge pipe 22.

The slurry flowing down from the discharge pipe 22 is uniformly led into the upstream end of the belt filter 30 through the feeder 38, and is somewhat dehydrated first by the action of gravity in the filtering range, and is spread widely in a uniform thickness over the entire width of the filter cloth 35. As the perforated belt 33 and filter cloth 35 rotate, the vacuum pan 37 gets into the disposed dehydrating range, wherein it is filtered in vacuum, and finally only the solid matter of the slurry reaches the terminal end (the folding position of the filter cloth 35) of the belt filter 30, and is discharged onto the belt conveyor 46, and is taken out as gypsum E (solid matter concentration about 90 wt. % or more).

In this way, according to the apparatus of the embodiment, by the separating and recovering device of a simple construction composed of cyclone 20 and belt filter 30 disposed compactly at the side of the periphery of the absorption tower 1, (gypsum E having a low content of water and impurities (unreacted limestone, etc.) can be recovered, hence and complicated and large devices such as slurry pump, thickener, and long piping are not needed, and the cost is notably reduced with substantial saving of installation space. In particular, in this embodiment, since the evacuating pump 42 of the belt filter 30, functions also as the air source for the oxidation of the absorption tower 1, the devices required particularly for separating and recovering gypsum are as well as cyclone 20, belt filter 30 as well as vacuum tank 41. Thus, only a small installation side is needed at one side of the absorption tower 1, except for the installation space of the vacuum tank 41.

Moreover, in the wet process flue gas desulfurization apparatus of the embodiment, the mixing rate of unreacted limestone is kept low by the separation action of the cyclone providing gypsum E of high purity and high quality. That is, usually, the suction position of the circulation pump 7 is near the feed position of limestone in the tank 2, and is set at the position of high concentration of unreacted limestone (usually the limestone content is about 5%), so that the reaction of absorption and oxidation is efficient. Accordingly, by merely dehydrating the slurry discharged from the circulation pump 7 and recovering as solid matter, the limestone is present in the obtained gypsum at the same content, and it is not preferred as the material of, for example, gypsum board. In the embodiment, however, since the limestone can be separated considerably by the cyclone 20, the lime content in the obtained gypsum E can be suppressed finally to a level (about 2%).

The cyclone 20 also dehydrates somewhat, and hence the gypsum E of high solid matter concentration is finally obtained without setting high the solid matter concentration in the tank 2 (for example, 30 wt. %) or without using a long belt filter 30. Hence, keeping small the installation space, the solid matter concentration in the tank 2 can be set low (for example, 20 wt. %), and the power consumption of the circulation pump 7 can be reduced.

The invention is not limited to the foregoing embodiment alone, but may be applied in various embodiments. For example, if the high purity of the byproduct gypsum is not desired (for example, for use in cement, it does not matter if limestone is contained by about 5%), the cyclone 20 is not needed. In this case, too, by setting high the solid matter concentration in the tank 2 (for example, 30 wt. %), or by extending the length of the belt filter 30 to increase the dehydrating capacity, the final solid matter concentration of gypsum E (about 90 wt. % or more) can be attained. Or the cyclone 20 may be replaced by other separator such as small thickener.

By furnishing the belt filter 30 with a nozzle for injecting cleaning water at the upstream side in the dehydrating range in which the vacuum pan 37 is disposed, the function for cleaning the gypsum cake may be provided to obtain excellent gypsum (chlorine concentration 100 ppm or less) lowered in the contents of chlorine and other impurities (the slurry in the tank 2 may contain about 10,000 ppm of chlorine).

According to the invention, the circulation pump may function as the pump for sucking out the slurry for separating and recovering gypsum, and the number of parts is curtailed. The piping and other constitution for separating and recovering gypsum is notably reduced in size, and can be installed compactly in the space around the absorption tower. Hence, the apparatus cost is notably reduced and installation space is also saved.

Moreover, by connecting the cyclone for concentrating the gypsum content in the slurry to the terminal end of the piping for leading the slurry into the belt filter, the concentrated slurry discharged from the lower end of the cyclone flows down into the slurry inlet of the belt filter, so that it is designed to dehydrate in two stages by cyclone and belt filter, and further the unreacted calcium compound is removed by this cyclone, so that the gypsum solid matter of extremely high purity is finally obtained if the water content in the tank in the absorption tower or the content of unreacted calcium compound is high. In this case, gypsum slurry is supplied into the cyclone from the circulation pump, and the concentrated slurry discharged from the slurry is directly led into the belt filter, and therefore an additional slurry pump is not needed. This cyclone is also installed compactly around the absorption tower, and the low apparatus cost and small installation space may be maintained.

Still more, when the belt filter functions as the air source of air feed means, the number of parts is decreased, and the apparatus cost is further lowered and the installation space is saved.

From the invention thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A wet process flue gas desulfurization apparatus for a tank oxidation system comprising an absorption tower having an inlet at an upper portion of the tower for receiving flue gas and a tank at a lower portion of the tower, said tank having a slurry containing a calcium compound, a circulation pump for feeding the slurry into the upper portion of said tower, air feed means for feeding oxidizing air into the tank thereby absorbing and further oxidizing sulfur dioxide in the flue gas by the slurry to produce gypsum, a vacuum belt filter disposed along a surface of a side wall of the absorption tower with an evacuating pump attached to the belt filter and functioning as an air source of said air feed means and having part of the slurry discharged from the circulation pump led into the belt filter to be dehydrated, thereby separating and recovering gypsum.

2. A wet process flue gas desulfurization apparatus for a tank oxidation system comprising an absorption tower having an inlet at an upper portion of the tower for receiving flue gas and a tank at a lower portion of the tower, said tank having a slurry containing a calcium compound, a circulation pump for feeding the slurry into the upper portion of said tower, air feed means for feeding air for oxidizing into the tank, thereby absorbing and further oxidizing sulfur dioxide in the flue gas by the slurry to produce gypsum, a vacuum belt filter and a cylone disposed along an outer surface of a side wall of the absorption tower, said cyclone separating gypsum from said slurry and connected to a terminal end of a piping for leading part of the slurry into the belt filter, and a concentrated slurry being discharged from a lower end of the cyclone flowing down into a slurry inlet of the belt filter and another part of the slurry being discharged from the circulation pump being led into the belt filter to be dehydrated, an evacuation pump attached to said belt filter and functioning as an air source for the air feed means, thereby separating and recovering gypsum.

* * * * *